UNITED STATES PATENT OFFICE.

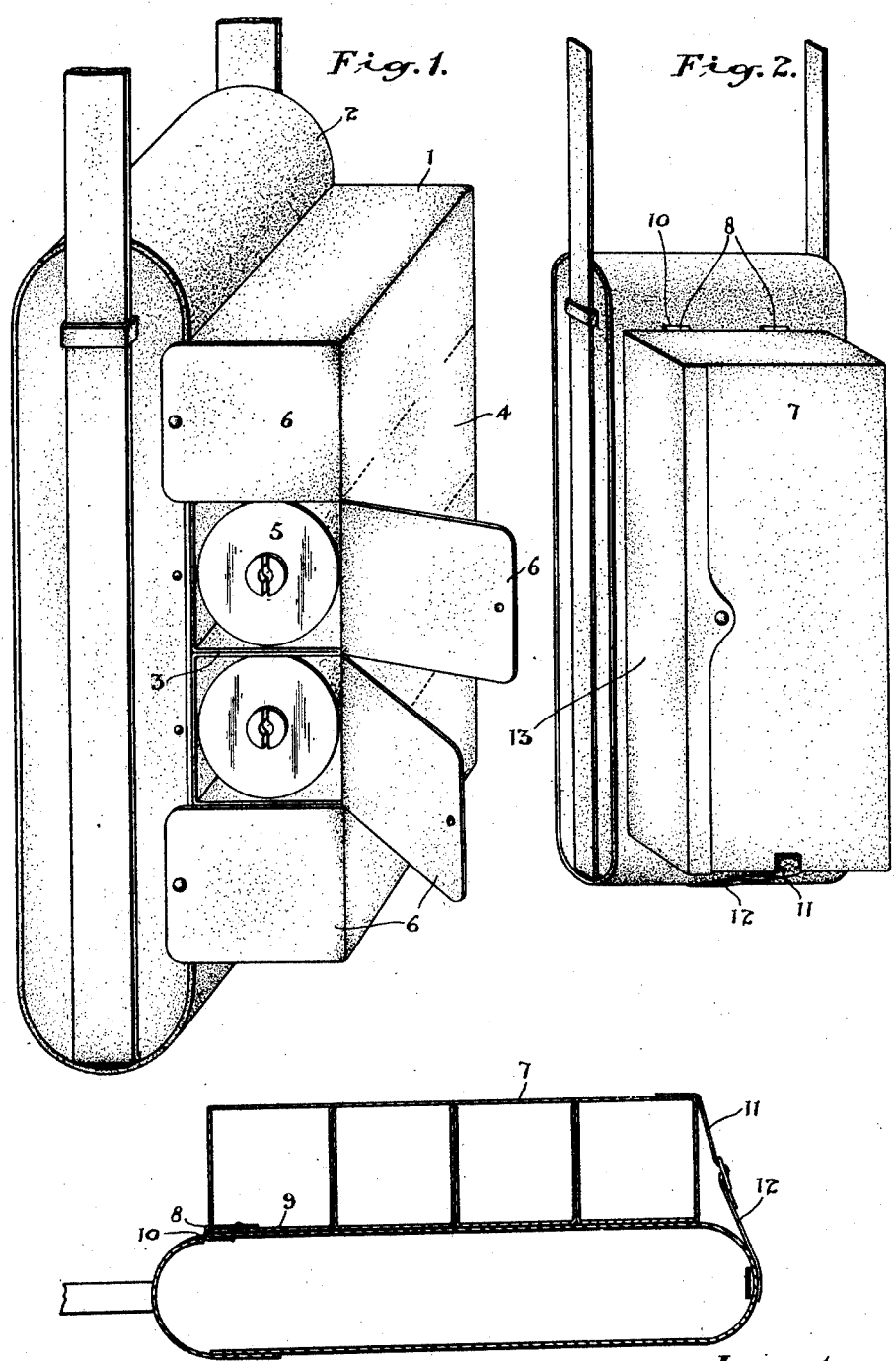

ALEXANDER BRUCE BOURNE, OF WALLACEBURG, ONTARIO, CANADA.

FILM HOLDER.

1,415,776.      Specification of Letters Patent.      Patented May 9, 1922.

Application filed November 4, 1918. Serial No. 260,970.

*To all whom it may concern:*

Be it known that I, ALEXANDER BRUCE BOURNE, a subject of the King of Great Britain, and resident of the town of Wallaceburg, county of Kent, Province of Ontario, in the Dominion of Canada, have invented certain new and useful Improvements in Film Holders, described in the following specification and illustrated in the accompanying drawings, that form part of the same.

The principal objects of this invention are, to provide a convenient form of device for holding camera films so that they will always be readily accessible and will be thoroughly protected against injury and exposure.

The principal feature of the invention consists in the novel arrangement of a film holding member attached to the camera case, whereby the rolls are enclosed within pockets and readily accessible.

In the drawings, Figure 1 is a perspective view showing my device attached to a camera case and shown partly open.

Figure 2 is a perspective view showing a slight modification of my device attached to a camera case.

Figure 3 is a longitudinal sectional view of the form of the device shown in Figure 2, illustrating the manner of attaching the holder to a camera case.

In actual photography, particularly with the use of small folding cameras it has been found a considerable handicap in not having proper accommodation for storing both new and exposed films and it is the principal object of this invention to provide a proper means for taking care of these.

In providing such accommodation I have devised a holder which in Figure 1 comprises a leather case 1 which is suitably secured by sewing or riveting to one of the flat sides of the camera case 2.

The case 1 is formed with an inner member comprising a length of leather or suitable fabric doubled at intervals to form the partition walls 3 such walls being suitably stitched to the outer wall 4 of the casing 1 and to the inner side or back of the camera case 2.

The interior of the case 1 is thus divided into a plurality of compartments adapted to receive the film rolls 5. The outer shell of the case 1 closes one end of the roll compartments and the other end is closed preferably by individual flaps 6 so that any one flap may be opened without disturbing the others, consequently the rolls contained in the other compartments cannot fall out or be accidentally injured. The flap may of course be made in a single piece if so desired, as is shown in Figure 2.

In the modified construction shown in Figures 2 and 3 the holding case 7 is formed separately from the camera case and at one end is provided with a pair of sheet metal hook members 8 which are rigidly secured to the back or inner side 9. These hook members are adapted to be inserted into the slots 10 cut in the camera case. The holder is secured in position at the opposite end by means of a strap 11 which is secured to the outer side of said case and secured to a short buckle strap 12 firmly connected to the bottom of the camera case.

The interior of this case is preferably divided into several compartments to receive the film rolls and the cover 13 closes the open end.

A holder such as described forms a part of the camera case and provides accommodation for several films and is very convenient. The cross partition may be dispensed with and the interior space used for storing flat films for certain types of cameras.

What I claim as my invention is:—

A camera film holder adapted to be connected to the side of the camera case and having one longitudinal side thereof open, a cover adapted to close said open side, and partitions arranged transversely of said holder forming a plurality of transverse compartments each open at one end.

ALEXANDER BRUCE BOURNE.